UNITED STATES PATENT OFFICE.

WILLIAM GARDINER, OF CHICAGO, ILLINOIS, ASSIGNOR, BY MESNE ASSIGNMENTS, TO D-G STORAGE BATTERY CO., OF CHICAGO, ILLINOIS, A CORPORATION OF DELAWARE.

ELECTROLYTE FOR STORAGE BATTERIES.

1,389,750.  Specification of Letters Patent.  Patented Sept. 6, 1921.

No Drawing.   Application filed August 22, 1918. Serial No. 250,971.

*To all whom it may concern:*

Be it known that I, WILLIAM GARDINER, a citizen of the United States of America, and resident of Chicago, Cook county, Illinois, have invented a certain new and useful Improvement in Electrolytes for Storage Batteries, of which the following is a specification.

My invention relates to an improvement in electrolyte for storage batteries, and has for its object the provision of an electrolyte which is of a solid consistency whereby a substantially dry storage battery is obtained. With the employment of such an electrolyte, storage batteries can be handled much more readily without danger of spilling the electrolyte, and thus the uses to which these storage batteries are put can be extended. Furthermore, by my invention I have provided an electrolyte which is in itself a substantially perfect insulator, thereby doing away with the necessity of using the ordinary separators which have heretofore been placed between the electrode plates in storage batteries.

These and other objects of my invention will be more clearly understood by reference to the following description of the preferred manner of preparing the electrolyte:

I first take a solution of sulfuric acid, of about 1300 specific gravity, and add to this solution pure powdered flint glass, sufficient powdered glass being added to make a mixture of creamy consistency. To this mixture, I then add a solution of sodium silicate, this solution being one part sodium silicate to two parts of water. The sulfuric acid and glass mixture is constantly stirred, while the sodium silicate solution is being added. I add this silicate solution to the acid solution in proportions of about one part silicate to about five parts acid. When these two solutions are thoroughly mixed, the same is then poured into the storage battery and permitted to set. In a few minutes the compound commences to harden, and soon assumes a solid condition, having a spongy and somewhat rubbery consistency. By reason of the fact that the body of this electrolyte is formed of the powdered flint glass, which is a perfect insulator, it is unnecessary to employ any separator plates in the storage battery, as the electrolyte itself forms an insulating wall to prevent short circuiting of the battery. It is merely necessary to provide suitable rods to hold the electrode plates in proper separated position. The storage battery with this electrolyte can be charged and discharged without effecting the solid condition of the electrolyte, it being merely necessary from time to time to add a small amount of water which is readily absorbed by the spongy electrolyte.

In order to insure a more uniform mixture in the storage battery, I find it at times advisable to permit the compounded electrolyte to settle and harden before placing the same in the battery. This spongy compound may then be thoroughly dried by heat, or other suitable means, and then broken up into a fine powder. This powder is then placed in the battery and then more of the electrolyte in its liquid condition—that, is, before it has been allowed to set—is added to this powdered compound in the battery in order to fill up all interstices. By following such a process, I find that slightly more uniform compound is obtained, as when the electrolyte is permitted to settle in the battery itself there is danger of the lower part of the compound being of a thicker consistency than the upper part.

With the battery thus filled with my electrolyte, the usual perforated rubber plate is then placed upon top of the electrolyte to prevent testing instruments from being thrust into the electrolyte.

It will thus be seen that I have devised a very efficient form of electrolyte, and while I have described the preferred embodiment of same, it will be understood that various changes can be made without departing from my invention, and that the proportions which I have set forth may be varied, although I have set forth what I consider the preferred proportions.

What I claim as my invention is:

An electrolyte for storage batteries including a mixture of powdered glass and an acid solution.

Signed by me at Chicago, Illinois, this 16 day of August, 1918.

WILLIAM GARDINER.